(12) United States Patent
Ishwar et al.

(10) Patent No.: US 7,688,823 B2
(45) Date of Patent: Mar. 30, 2010

(54) EFFICIENT MECHANISM FOR WIRE-TAPPING NETWORK TRAFFIC

(75) Inventors: Prashanth Ishwar, Santa Clara, CA (US); Apurva Mehta, Cupertino, CA (US); Juan Sanchez, San Jose, CA (US); Apoorv Saxena, Santa Clara, CA (US); Shiva Shenoy, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1510 days.

(21) Appl. No.: 10/455,512

(22) Filed: Jun. 4, 2003

(65) Prior Publication Data

US 2004/0022261 A1 Feb. 5, 2004

Related U.S. Application Data

(60) Provisional application No. 60/385,949, filed on Jun. 4, 2002.

(51) Int. Cl.
*H04L 12/28* (2006.01)
*H04L 12/56* (2006.01)

(52) U.S. Cl. ............. 370/390; 370/395.31; 370/395.32

(58) Field of Classification Search ................. 370/428, 370/392, 395.31, 395.32; 709/239
See application file for complete search history.

(56) References Cited

U.S. PATENT DOCUMENTS

| | | | | |
|---|---|---|---|---|
| 5,550,816 | A * | 8/1996 | Hardwick et al. | 370/397 |
| 5,917,821 | A * | 6/1999 | Gobuyan et al. | 370/392 |
| 5,940,376 | A * | 8/1999 | Yanacek et al. | 370/250 |
| 6,553,000 | B1 * | 4/2003 | Ganesh et al. | 370/235 |
| 6,553,025 | B1 * | 4/2003 | Kung et al. | 370/352 |
| 6,654,589 | B1 * | 11/2003 | Haumont | 455/67.11 |
| 6,678,270 | B1 * | 1/2004 | Garfinkel | 370/392 |
| 6,741,595 | B2 * | 5/2004 | Maher et al. | 370/392 |
| 6,751,746 | B1 * | 6/2004 | Jain et al. | 714/4 |
| 6,801,525 | B1 * | 10/2004 | Bodnar et al. | 370/352 |
| 6,839,351 | B1 * | 1/2005 | Chow et al. | 370/392 |
| 6,870,905 | B2 * | 3/2005 | Pelaez et al. | 379/35 |
| 6,963,566 | B1 * | 11/2005 | Kaniz et al. | 370/392 |
| 6,990,102 | B1 * | 1/2006 | Kaniz et al. | 370/392 |
| 7,031,304 | B1 * | 4/2006 | Arberg et al. | 370/360 |

(Continued)

FOREIGN PATENT DOCUMENTS

WO WO 02/082782 A2 10/2002

(Continued)

*Primary Examiner*—Rafael Pérez-Gutiérrez
*Assistant Examiner*—Allahyar Kasraian
(74) *Attorney, Agent, or Firm*—Wilson & Ham Patent Attorneys (57) ABSTRACT

An efficient mechanism for wire-tapping network traffic is disclosed. In one embodiment of the invention, a primary forwarding lookup process and a secondary forwarding lookup process are performed in parallel and independently of each other. The primary forwarding lookup process determines the output interface to which the packet is to be routed regardless of whether the packet is to be intercepted. The secondary forwarding lookup process determines whether the packet is to be intercepted and also determines the output interface to which a copy of the packet is to be routed. Because the lookup processes are performed independently and in parallel, normal packet forwarding can be performed at line rate or near line rate while the packets are intercepted.

20 Claims, 6 Drawing Sheets

U.S. PATENT DOCUMENTS

| | | | |
|---|---|---|---|
| 7,046,663 B1* | 5/2006 | Temoshenko et al. | 370/390 |
| 7,266,117 B1* | 9/2007 | Davis | 370/363 |
| 7,412,507 B2* | 8/2008 | Saxena et al. | 709/224 |
| 2001/0050914 A1* | 12/2001 | Akahane et al. | 370/382 |
| 2002/0009083 A1* | 1/2002 | Ambe et al. | 370/390 |
| 2002/0101867 A1* | 8/2002 | O'Callaghan et al. | 370/389 |
| 2002/0116527 A1* | 8/2002 | Chen et al. | 709/245 |
| 2002/0146009 A1* | 10/2002 | Gupta et al. | 370/392 |
| 2003/0026268 A1* | 2/2003 | Navas | 370/400 |
| 2003/0101276 A1* | 5/2003 | Park et al. | 709/238 |
| 2003/0118042 A1* | 6/2003 | Nishida et al. | 370/404 |
| 2006/0029104 A1* | 2/2006 | Jungck | 370/498 |
| 2006/0274755 A1* | 12/2006 | Brewer et al. | 370/392 |

FOREIGN PATENT DOCUMENTS

WO    WO 02/102111 A1    12/2002

\* cited by examiner

| Primary EPTI |
|---|
| A |
| B |
| C |
| D |
| E |
| F |
| . . . |

| Source IP Addr. | Dest. IP Addr. |
|---|---|
| X | 10.1.1.1 |
| X | 11.1.1.1 |
| X | 12.1.1.1 |
| X | 13.1.1.1 |
| X | 17.1.1.1 |
| X | 19.1.1.1 |
| . . . | . . . |

Fig. 3

| Source IP Addr. | Dest. IP Addr. | Source Socket | Dest. Socket | Input I/F | Secondary EPTI |
|---|---|---|---|---|---|
| 230.1.1.1 | 10.1.1.1 | a | c | x | M |
| 232.1.1.1 | 10.1.1.1 | a | c | x | N |
| 233.1.1.1 | 11.1.1.1 | a | c | x | O |
| 236.1.1.1 | 11.1.1.1 | x | x | x | P |
| 237.1.1.1 | 11.1.1.1 | x | x | y | Q |
| 238.1.1.1 | 12.1.1.1 | x | x | z | R |
| ... | ... | ... | ... | ... | ... |

EFFICIENT MECHANISM FOR WIRE-TAPPING NETWORK TRAFFIC

CROSS-REFERENCE TO RELATED APPLICATION

This application is entitled to the benefit of provisional Patent Application Ser. No. 60/385,949, filed 4 Jun. 2002, which is hereby incorporated by reference for all purposes.

FIELD OF THE INVENTION

The present invention relates generally to the field of computer networking and more specifically to wire-tapping packets within a computer network.

BACKGROUND OF THE INVENTION

"Wire-tapping" or "port mirroring" is a mechanism by which certain traffic ingressing or egressing a network node is sent through an arbitrary interface while the packet is also forwarded normally. Lawfully-authorized wire-tapping is considered to be an invaluable tool for law enforcement agencies in their fight against crime and terrorism.

In some prior art wire-tapping methods, normal forwarding lookup is first performed on a packet in question. Then, an "intercept lookup"—a process that determines whether the packet meets certain predefined profiles—is performed. If the packet indeed meets the predefined profiles, the packet is replicated and a copy of the packet is forwarded to a law enforcement agency. The packet is forwarded normally to its intended destination after the intercept lookup. An example of such prior art wire-tapping methods is shown in FIG. 1.

Figure 1:
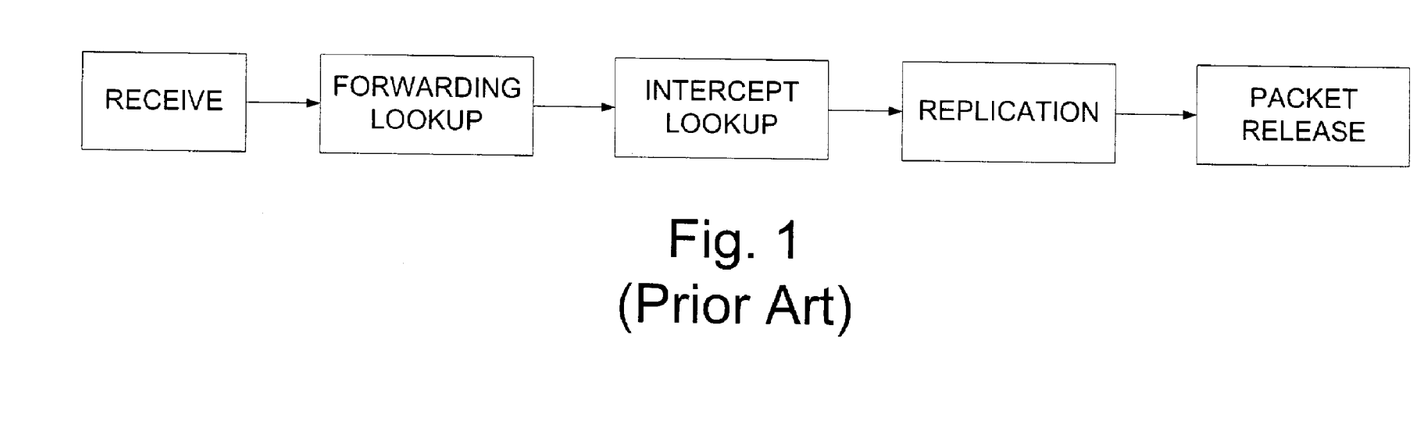
FIG. 1 depicts a prior art wire-tapping method.

One problem with the prior art method of FIG. 1 is that normal packet forwarding is delayed until the intercept lookup is complete. Sources and receivers of the intercepted network traffic may be able to detect the delay, thus undermining the effectiveness of the wire-tap.

Accordingly, what is needed is a mechanism for wire-tapping network traffic efficiently such that the wire-tapping activities are undetectable to the originator and recipient(s) of the network traffic.

SUMMARY OF THE INVENTION

The invention provides an efficient mechanism for wire-tapping network traffic. In one embodiment, a primary forwarding lookup process and a secondary forwarding lookup process are performed in parallel and independently of each other. The primary forwarding lookup process determines the output interface to which the packet is to be routed regardless of whether the packet is to be intercepted. The secondary forwarding lookup process determines whether the packet meets a certain interception profile and also determines the output interface, if any, to which a copy of the packet is to be routed. Because the lookup processes are performed independently and in parallel, network traffic can be forwarded to their intended destinations without additional delay imposed by the secondary lookup process.

In one embodiment, the primary forwarding lookup process includes the steps of obtaining a destination IP address of the packet and searching for a match in a primary forwarding information table. This primary forwarding lookup process is not unlike a typical packet forwarding process. Thus, it is difficult for the wire-tapped party to detect the presence of wire-tapping activities. Furthermore, because typical packet forwarding mechanisms can be used, hardware and software for performing primary forwarding lookup do not have to be redesigned from scratch.

According to one embodiment, the secondary forwarding lookup process includes the steps of obtaining profile information from the traffic and searching for a match in a secondary forwarding lookup table in which each entry contains profile information and a corresponding SEPTI (Secondary Exit Port Table Index). Typical profile information includes, but is not limited to, source IP address, destination IP address, source socket, destination socket, input interface, output interface, protocol information, Type of Service (TOS) information, and/or Port of Entry (POE) information. The SEPTI is an index to another table where the exit port information is stored. In one embodiment, the secondary forwarding lookup table can also store forwarding information for policy routing.

Another advantage of the invention is that the secondary forwarding lookup table can include a large number of search fields and a large number of intercept profiles. When a large number of search fields are used, incisive wire-tapping can be performed using highly selective intercept criteria.

Other aspects and advantages of the invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

The invention provides a novel method and apparatus for wire-tapping network traffic. In one embodiment, a primary forwarding lookup process and a secondary forwarding lookup process are performed in parallel and independently of each other. The primary forwarding lookup process determines the output interface to which the packet is to be routed. The secondary forwarding lookup process determines whether the packet fits an interception profile and also determines the output interface, if any, to which a copy of the packet is to be routed. Because the lookup processes are performed independently and in parallel, network traffic can be forwarded to their intended destinations without additional delay imposed by the secondary lookup process.

Figure 2:
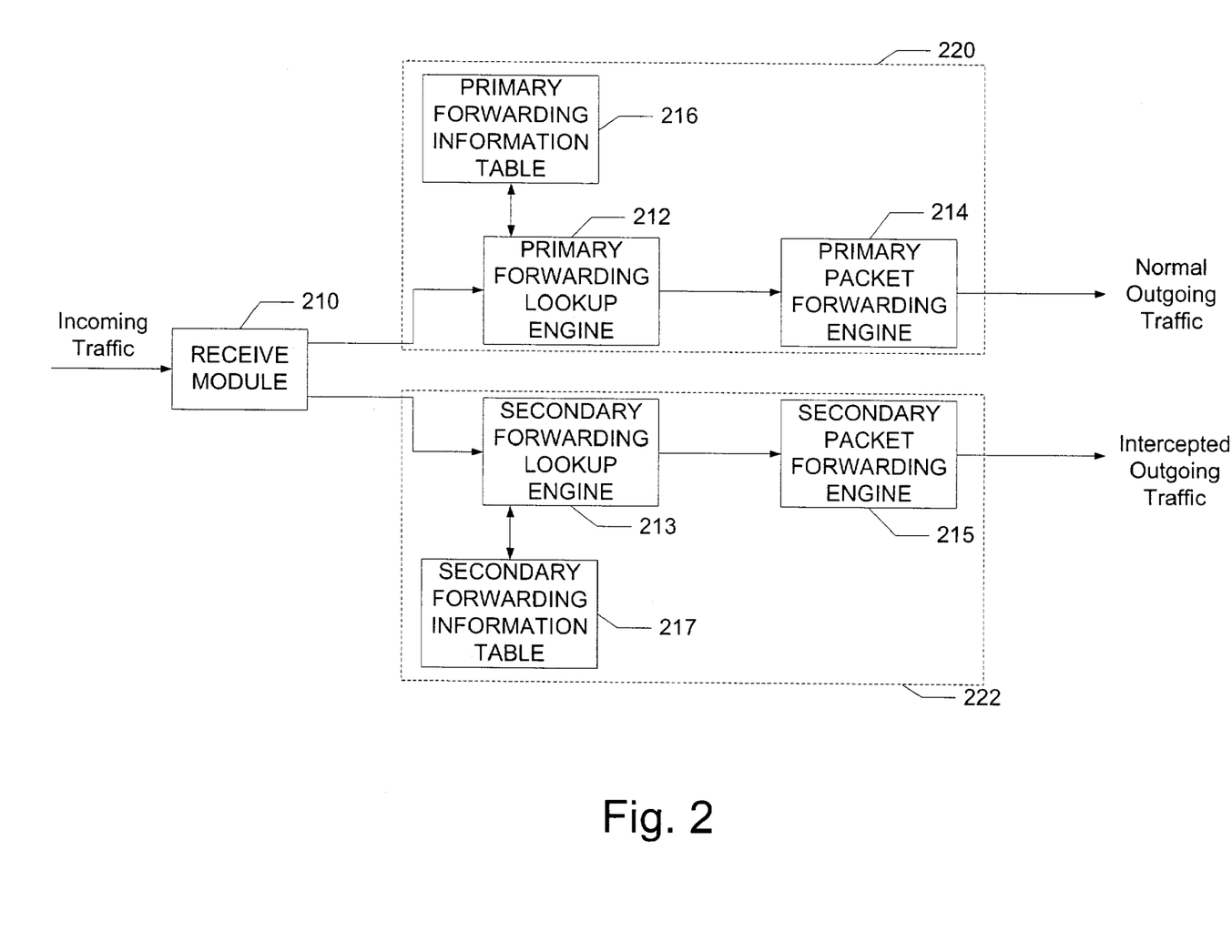
FIG. 2 is a block diagram illustrating part of a network node (e.g., a router or a switch) in which an embodiment of the invention is implemented.

FIG. 2 is a block diagram illustrating part of a network node (e.g., a switch/router) in which an embodiment of the invention is implemented. As shown, the network node includes a Receive Module 210, a Primary Forwarding Path 220, and a Secondary Forwarding Path 222. The Primary Forwarding Path includes a Primary Forwarding Lookup Engine 212, a Primary Packet Forwarding Engine 214, and a Primary Forwarding Information Table 216. The Secondary Forwarding Path 222 includes a Secondary Forwarding Lookup Engine 213, and a Secondary Packet Forwarding Engine 215.

The Receive Module 210 is configured to receive packets from an external source or from another part of the network node. In one embodiment, the Receive Module 210 buffers the received packets and parses the header portions of the received packets for relevant information. More particularly, the Receive Module 210 obtains a Destination IP Address from the received packets and provides the Destination IP Address to the Primary Forwarding Path 220. In other embodiments, the Receive Module 210 may obtain any other type of information from the packet and provide such information to the Primary Forwarding Path 220.

Figure 3:
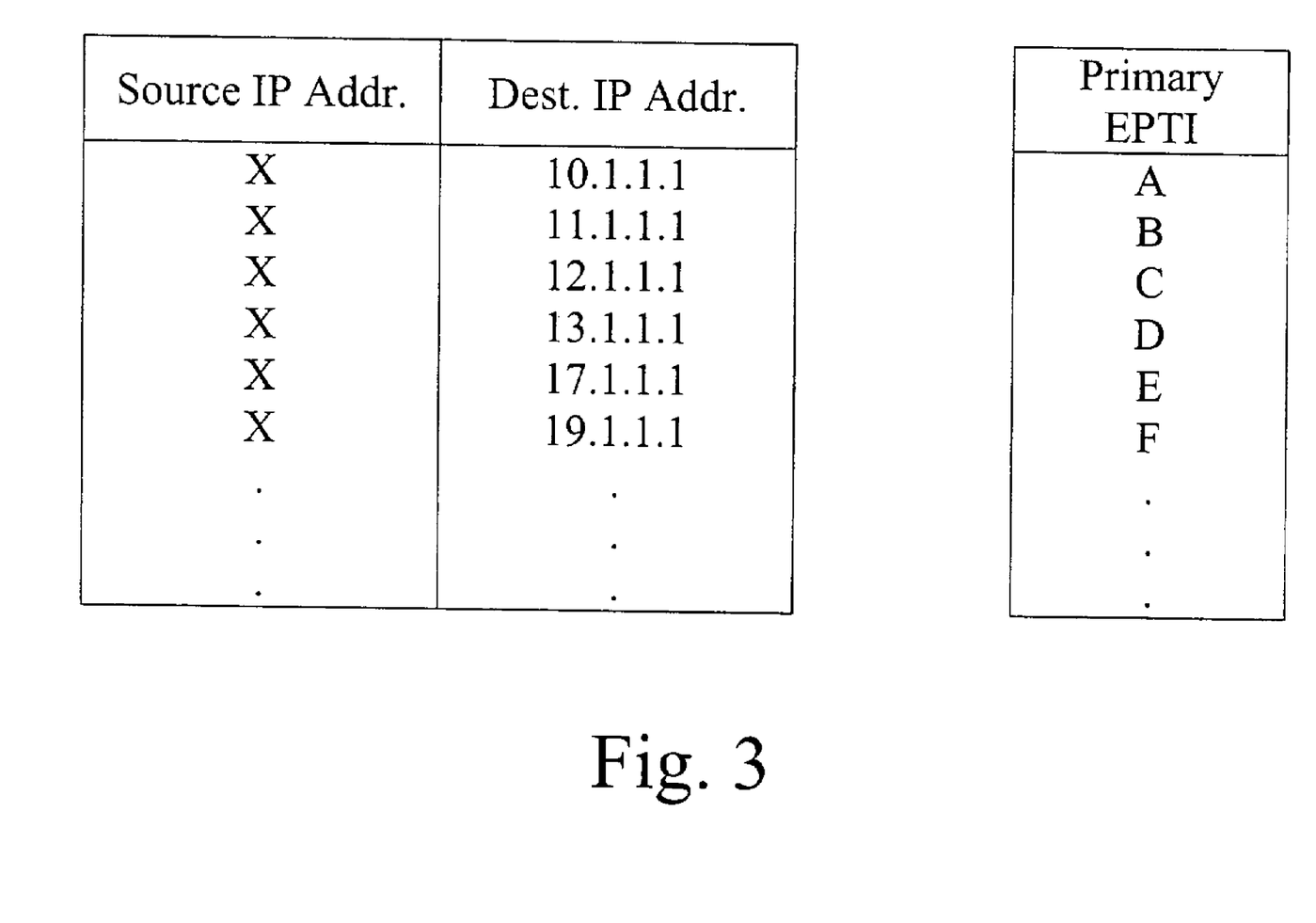
FIG. 3 depicts a Primary Forwarding Information Table according to one embodiment of the invention.

When the Primary Forwarding Lookup Engine 212 receives the Destination IP Address, the Engine 212 performs a lookup on the Primary Forwarding Information Table 216, an example of which is illustrated in FIG. 3. The example Primary Forwarding Information Table, which is sometimes referred to as an "L3 lookup table," is used to forward Internet Protocol (IP) traffic to the next hop. The search field of the Primary Forwarding Information Table 216 may include a "Source IP Addr" (source IP address) and a "Dest. IP Addr" (destination IP address). The result field of the lookup table may include some associated data, such as next hop information and/or a pointer to another location that holds next hop information. The pointer to another location that holds next hop information is called a Primary EPTI (Exit Port Table Index) in one embodiment of the invention.

With reference again to FIG. 2, after performing a lookup, the Primary Forwarding Lookup Engine 212 provides the retrieved data (e.g., Primary EPTI) to the Primary Packet Forwarding Engine 214. In one embodiment, the Primary Packet Forwarding Engine 214 uses the Primary EPTI to retrieve next hop information from a Primary Exit Port Table (not shown) and forwards the packet accordingly.

In addition to parsing the packet for the Primary Forwarding Path 220, the Receive Module 210 parses the header of the received packet for information that is relevant to the Secondary Forwarding Path 222. In one embodiment, the Receive Module 210 obtains Profile Information from the received packets and provides the Profile Information to the Secondary Forwarding Path 222. In the present disclosure, "Profile Information" refers to any information contained in a packet or information about the packet that allows the network node to determine whether the packet fits certain predefined profile. Examples of Profile Information include, but are not limited to, source IP address, destination IP address, source socket, destination socket, input interface identifier, output interface identifier, protocol type, Type of Service (TOS) information, and Port of Entry (POE) information.

Figure 4:
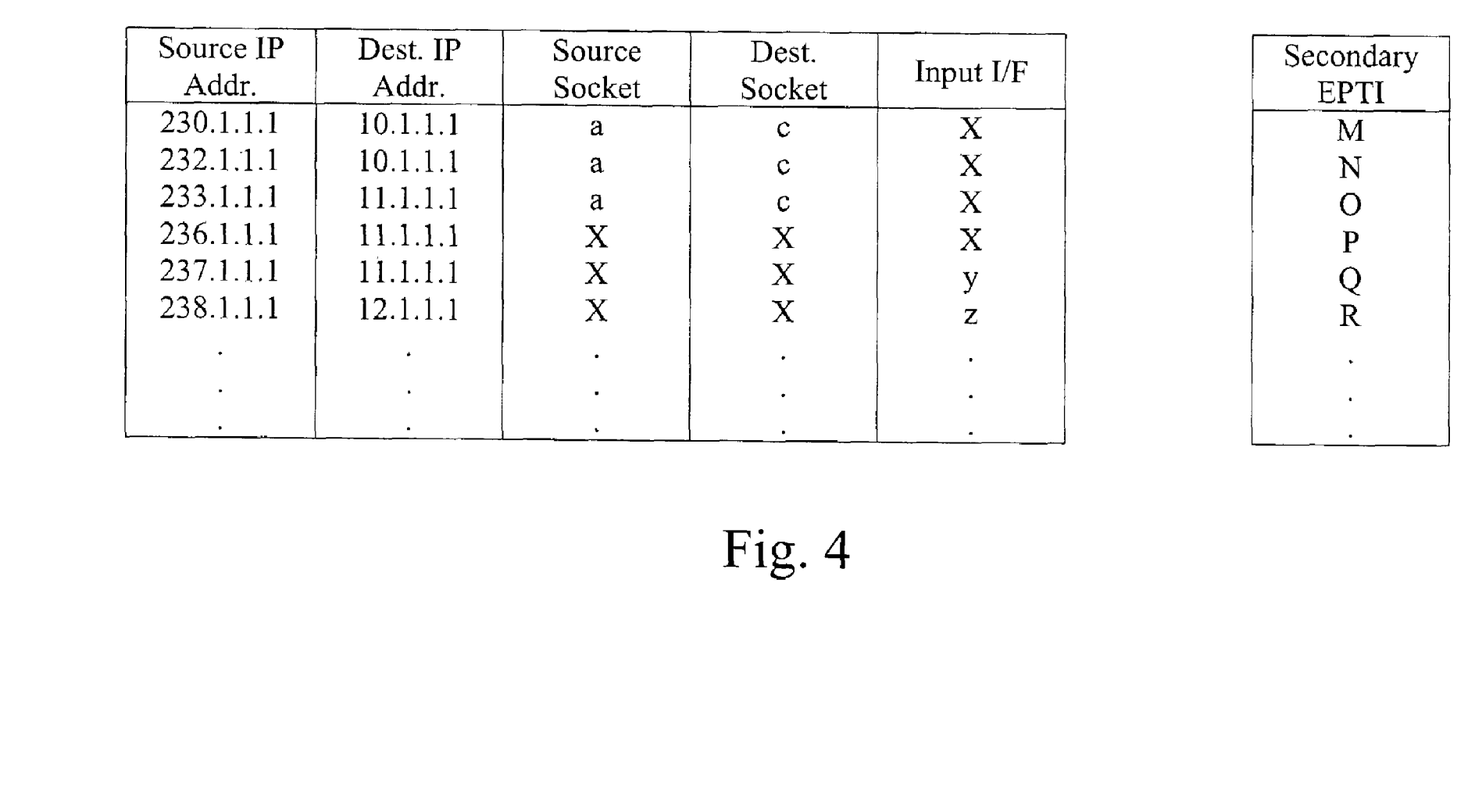
FIG. 4 depicts a Secondary Forwarding Information Table according to one embodiment of the invention.

When the Secondary Forwarding Lookup Engine 213 receives the Profile Information, the Engine 213 performs a lookup on the Secondary Forwarding Information Table 217, an example of which is illustrated in FIG. 4. The search fields of the Secondary Forwarding Information Table 217 of FIG. 4 include a "Source IP Addr.", a "Dest. IP Addr.", a "Source Socket," a "Destination Socket," and an "Input I/F" (Input Interface). The result fields of the Secondary Forwarding Information Table 217 include a Secondary EPTI (Exit Port Table Index), or SEPTI, which is a pointer to another location that holds next hop information. The result fields of the Secondary Forwarding Information Table 217 may include some other data fields.

Referring again to FIG. 2, if the Profile Information of a packet matches any predefined profile stored in the Secondary Forwarding Information Table 217, the Secondary Forwarding Lookup Engine 213 provides the corresponding SETPI to the Secondary Packet Forwarding Engine 215. In the embodiment shown in FIG. 2, the Secondary Packet Forwarding Engine 215 uses the Secondary EPTI to retrieve next hop information (e.g., the intercepting party's IP address, port identifier of the monitoring port) from a Secondary Exit Port Table (not shown) and forwards the packet accordingly.

In one embodiment, the Secondary Forwarding Information Table 217 contains profile information of packets that a user (e.g., a network node administrator or a law enforcement agency) desires to intercept. The Secondary Exit Port Table (not shown) contains information of the monitoring port and/or address of the intercepting party. Packets with header information matching any one of the profiles stored in the Secondary Forwarding Lookup Table 217 will be forwarded to the monitoring port and/or the address of the intercepting party.

In one embodiment, the Secondary Forwarding Information Table 217 includes many search fields. One advantage of having many search fields is that each search profile can be made to be highly specific. As a result, highly profile-specific wire-tapping can be performed by embodiments of the invention.

Attention now turns to an example that illustrates operations of the embodiment. Suppose a law enforcement agency desires to intercept network traffic having a particular profile. In this example, suppose the profile consists of a source IP address "236.1.1.1" and a destination IP address of "11.1.1.1". The network administrator first configures the Secondary Forwarding Information Table 217 to contain the profile as specified by the law enforcement agency. The network administrator also stores the law enforcement agency's IP address in the Secondary Exit Port Table, and stores a pointer to the entry's address in the corresponding entry of the Secondary Forwarding Information Table 217. When the network node receives a packet fitting the specified profile, the network node will be able to determine that, if there is a match in the Secondary Exit Port Table, that the packet should be intercepted. The network node will also be able to determine from the Secondary EPTI index and the Secondary Exit Port Table the appropriate interfaces to which a copy of the intercepted packet should be sent.

According to an embodiment of the invention, forwarding operations of the Primary Forwarding Path 220 are performed in parallel with and independent of forwarding operations of the Secondary Forwarding Path 222. For example, the lookup operations performed by the Secondary Forwarding Lookup Engine 213 are performed independently of the results of lookup operations performed by the Primary Forwarding Lookup Engine 212, and vice versa. In this way, forwarding operations performed by the Primary Forwarding Path 220 are not delayed or affected by operations of the Secondary Forwarding Path 222.

In one embodiment, the Secondary Forwarding Lookup Table 217 may require very little memory. In that case, the Secondary Forwarding Lookup Table can be stored together with a Policy Routing Lookup Table in a CAM (Content Addressable Memory). In that embodiment, the Secondary Forwarding Lookup Engine 213 and the Secondary Packet Forwarding Engine 215 can also be used for policy routing.

Figure 5:
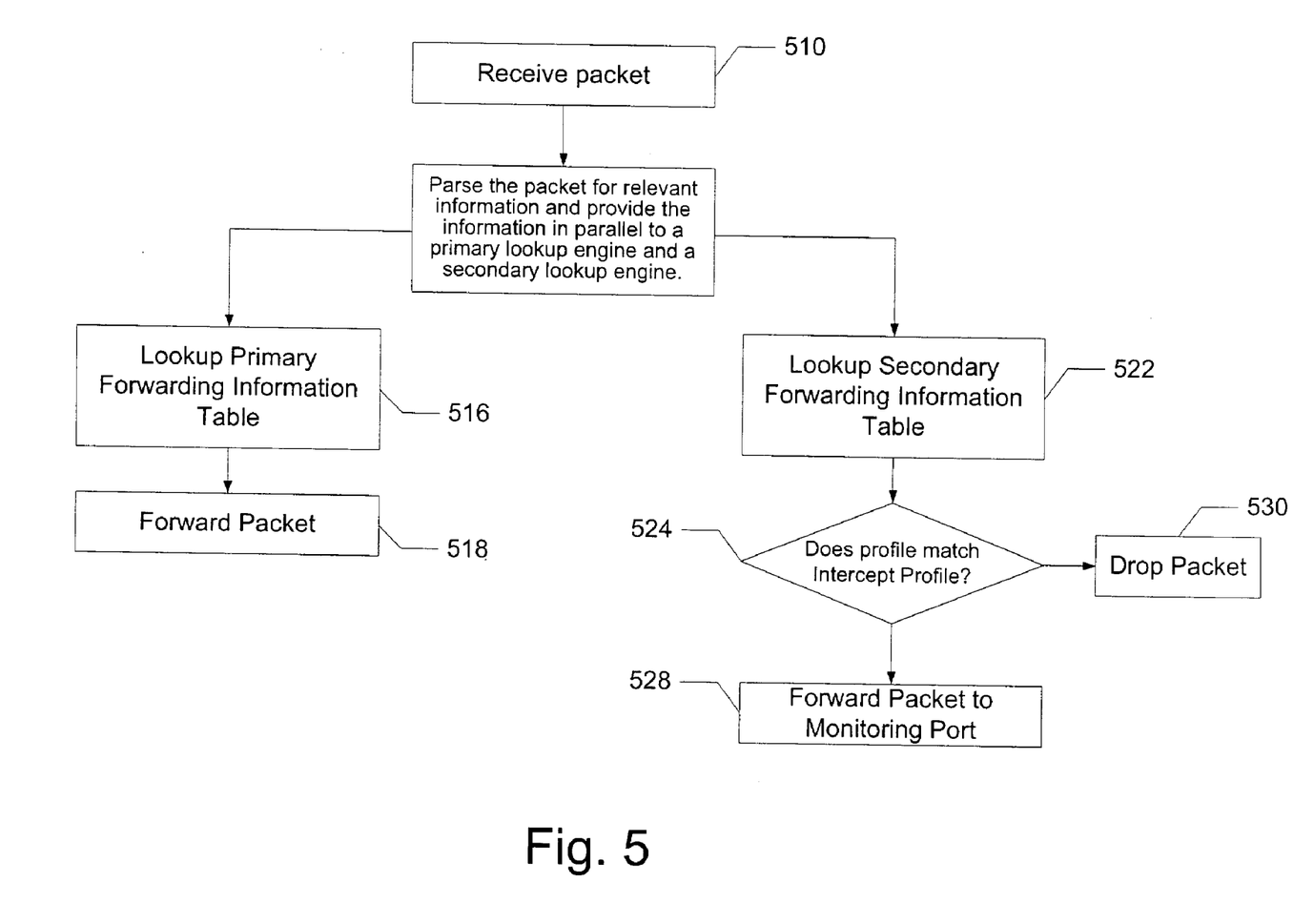
FIG. 5 is a flow diagram depicting steps of a method of the invention.

Referring now to FIG. 5, there is shown a flow diagram depicting an embodiment of the invention. The method depicted in the flow diagram of FIG. 5 can be performed by a network node, such as a router/switch.

As shown, at step 510, the network node receives and buffers a packet. Thereafter, the network node parses the packet for relevant information and provides the information in parallel to a primary lookup engine and a secondary lookup engine (step 512). The primary lookup engine then performs a lookup on the Primary Forwarding Information Table using the retrieved information (step 516), and forwards the packet according to the results of the lookup operations (step 518).

While the primary lookup engine is performing steps 516 to 518, the secondary lookup engine independently performs steps 522 to 528. In particular, the secondary lookup engine uses the provided information to perform a lookup on the Secondary Forwarding Information Table (step 522). At decision point 524, the network node determines whether the retrieved profile information matches any predetermined profiles stored within the Secondary Information Table. If a match cannot be found, the packet is discarded. However, if a match is found, a copy of the packet is forwarded to an appropriate output port, as specified by information of the Secondary Forwarding Information Table (step 528).

Note that the primary lookup and the secondary lookup are performed in parallel and independently of each other. Whether the packet meets the profile for interception does not affect the forwarding of the packet by the primary forwarding engine.

It should be noted that the packet can be replicated before or after step 516 and step 522. In one embodiment, the hardware of the network node is configured such that packet replication occurs before it has been whether the packet fits an interception profile. In another embodiment, a packet is replicated only after it has been determined that the packet fits an interception profile.

Figure 6:
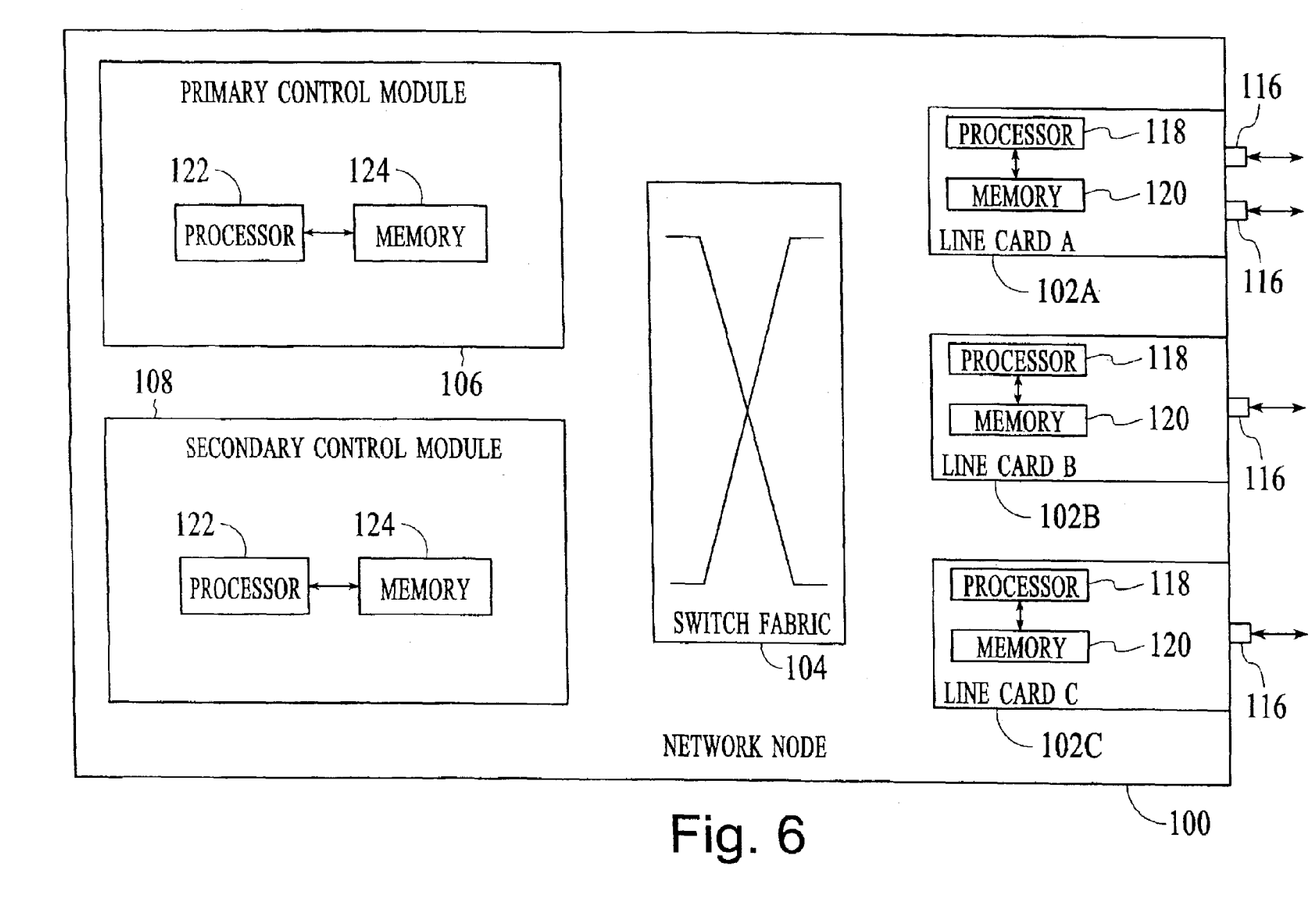
FIG. 6 depicts details of a network node in which an embodiment the invention can be implemented.

FIG. 6 illustrates details of a network node 100 in which an embodiment of the invention can be implemented. The network node 100 includes a primary control module 106, a secondary control module 108, a switch fabric 104, and three line cards 102A, 102B, and 102C (line cards A, B, and C). The switch fabric 104 provides datapaths between input ports and output ports of the network node 100 and may include, for example, shared memory, shared bus, and crosspoint matrices.

The primary and secondary control modules 106 and 108 support various switch/router and control functions, such as network management functions and protocol implementation functions. The control modules 106 and 108 each include a processor 122 and memory 124 for carrying out the various functions. The processor 122 may include a multifunction microprocessor (e.g., an Intel i386 processor) and/or an application specific processor that is operationally connected to the memory. The memory 124 may include electrically erasable programmable read-only memory (EEPROM) or flash ROM for storing operational code and dynamic random access memory (DRAM) for buffering traffic and storing data structures, such as forwarding information.

The line cards 102A, 102B, and 102C each include at least one port 116, a processor 118, and memory 120. The processor 118 may be a multifunction processor and/or an application specific processor that is operationally connected to the memory 120, which can include a RAM or a Content Addressable Memory (CAM). Each of the processors 118 performs and supports various switch/router functions. Each line card also includes Primary Forwarding Lookup Engine 212 and Secondary Forwarding Lookup Engine 213 that can access memory 120. Each line card also includes a Primary Packet Forwarding Engine 214 and a Secondary Packet Forwarding Engine 215. According to the invention, hardware implementation of the Primary Forwarding Lookup Engine 212, Secondary Forwarding Lookup Engine 213, Primary Packet Forwarding Engine 214 and Secondary Packet Forwarding Engine 215 enables packets to be forwarded and intercepted at line rate or near line rate. In another embodiment, part or all of the functions of the invention can be implemented by software running on the line card processors (e.g., processor 118) and/or the control module processors (e.g., processor 122).

According to one embodiment of the invention, when a packet is forwarded, it is written to the switch fabric 104. In this embodiment, when a packet is intercepted, it is written to the switch fabric 104 more than once to different ports of the network node.

Although specific embodiments of the invention have been described and illustrated, the invention is not to be limited to the specific forms or arrangements of parts as described and illustrated herein. For instance, it should also be understood that throughout this disclosure, where a software process or method is shown or described, the steps of the method may be performed in any order or simultaneously, unless it is clear from the context that one step depends on another being performed first. Furthermore, although some embodiments of the invention have been described in the context of layer 3 of the Open System Interconnection (OSI) model of the International Standards Organization (ISO), a person of ordinary skill in the art having the benefit of this disclosure would realize that the invention is also applicable to other protocol layers of the OSI model. The invention is limited only by the claims.

What is claimed is:

1. A method of wire-tapping traffic flows received by a network node, the method comprising:
   receiving a packet;
   wire-tapping the received packet by:
       parsing header information of the packet by obtaining relevant primary header information and relevant secondary header information;
   performing in parallel a primary forwarding lookup process using the relevant primary header information and a secondary forwarding lookup process using the relevant secondary header information, wherein the primary and secondary lookup processes are performed independently of each other and wherein the secondary forwarding lookup process comprises:
       obtaining a profile information of the packet; and
       searching a secondary forwarding information table for second forwarding information that is associated with the profile information;
       independently of the secondary forwarding lookup process, forwarding the packet to a first exit port of the network node specified by at least in part a result of the primary forwarding lookup process; and
       independently of the primary forwarding lookup process, forwarding a copy of the packet to a second exit port of the network node specified by at least in part a result of the secondary forwarding lookup process.

2. The method of claim 1, wherein the primary forwarding lookup process comprises:
   obtaining an intended destination address of the packet; and
   searching a primary forwarding information table for first forwarding information that is associated with the intended destination address.

3. The method of claim 2, wherein the first forwarding information comprises a Primary Exit Port Table Index corresponding to a port of the network node.

4. The method of claim 1, wherein the second forwarding information comprises a Secondary Exit Port Table Index corresponding to a port of the network node.

5. The method of claim 4, wherein the profile information comprises at least one of: a source address, a destination address, a source socket, a destination socket, an input interface identifier, an output interface identifier, a protocol type, Type of Service (TOS) information, and Port of Entry (POE) information.

6. A network node, comprising:
an interface for receiving a packet, wherein the header portion of the received packet is parsed by obtaining relevant primary header information and relevant secondary header information;
a primary lookup engine coupled to the interface and configured to perform a primary forwarding lookup process using the relevant primary header information obtained from received packet;
a primary forwarding engine coupled to the primary lookup engine and configured to forward the received packet to a first exit port of the network node specified by at least in part a result of the primary forwarding lookup process;
a secondary lookup engine coupled to the interface and configured to perform a secondary forwarding lookup process using the relevant secondary header information obtained from the received packet, wherein the secondary forwarding lookup process is performed independently of and in parallel with the primary forwarding lookup process, wherein the secondary lookup engine obtains a profile information of the packet and searches a secondary forwarding information table for second forwarding information that is associated with the profile information; and
a secondary forwarding engine coupled to the secondary lookup engine and configured to forward a copy of the received packet to a second exit port of the network node specified by at least in part a result of the secondary forwarding lookup process.

7. The network node of claim 6, wherein the interface comprises logic for replicating the packet.

8. The network node of claim 6, wherein the secondary forwarding engine comprises logic for replicating the packet when the result of the secondary forwarding lookup process indicates that the profile of the packet matches a predetermined-profile.

9. The network node of claim 6, wherein the primary lookup engine generates forwarding information for the packet based on a destination address of the packet.

10. The network node of claim 6, wherein the secondary lookup engine generates forwarding information for the packet based on profile information of the packet.

11. The network node of claim 6, comprising a primary forwarding information table.

12. The network node of claim 11, wherein the primary lookup engine obtains an intended destination address of the packet and searches the primary forwarding information table for first forwarding information that is associated with the intended destination address.

13. The network node of claim 12, wherein the first forwarding information comprises a Primary Exit Port Table Index corresponding to a port of the network node.

14. The network node of claim 6, wherein the second forwarding information comprises a Secondary Exit Port Table Index corresponding to a port of the network node.

15. The network node of claim 14, wherein the profile information comprises at least one of: a source address, a destination address, a source socket, a destination socket, an input interface identifier, an output interface identifier, a protocol type, Type of Service (TOS) information, and Port of Entry (POE) information.

16. A method of wire-tapping traffic flows received by a network node, the method comprising:
receiving a packet;
wire-tapping the received packet by:
parsing header information of the packet by obtaining relevant primary header information and relevant secondary header information;
performing in parallel a primary forwarding lookup process using the relevant primary header information and a secondary forwarding lookup process using the relevant secondary header information, wherein the primary and secondary lookup processes are performed independently of each other, wherein the secondary forwarding lookup process comprises:
obtaining a profile information of the packet; and
searching a secondary forwarding information table for second forwarding information that is associated with the profile information;
forwarding a copy of the received packet to a first exit port of the network node specified by at least in part a result of the primary forwarding lookup process; and
forwarding another copy of the packet to a second exit port of the network node specified by at least in part a result of the secondary forwarding lookup process,
wherein the first forwarding step is performed independently of the second forwarding lookup process.

17. The method of claim 16, wherein the primary forwarding lookup process comprises:
obtaining an intended destination address of the packet; and
searching a primary forwarding information table for first forwarding information that is associated with the intended destination address.

18. The method of claim 17, wherein the first forwarding information comprises a Primary Exit Port Table Index corresponding to a port of the network node.

19. The method of claim 16, wherein the second forwarding information comprises a Secondary Exit Port Table Index corresponding to a port of the network node.

20. The method of claim 19, wherein the profile information comprises at least one of: a source address, a destination address, a source socket, a destination socket, an input interface identifier, an output interface identifier, a protocol type, Type of Service (TOS) information, and Port of Entry (POE) information.

* * * * *